(12) United States Patent
Bushnell et al.

(10) Patent No.: US 9,290,057 B2
(45) Date of Patent: Mar. 22, 2016

(54) ALL SEASON SAFETY TIRE

(71) Applicant: Innovative Technologies, LLC, Gladstone, OR (US)

(72) Inventors: Raymond B. Bushnell, Beavercreek, OR (US); Bradley K. S. Larson, Beaverton, OR (US)

(73) Assignee: INNOVATIVE TECHNOLOGIES, LLC, Gladstone, OR (US)

( * ) Notice: Subject to any disclaimer, the term of this patent is extended or adjusted under 35 U.S.C. 154(b) by 452 days.

(21) Appl. No.: 13/663,918

(22) Filed: Oct. 30, 2012

(65) Prior Publication Data

US 2013/0105050 A1 May 2, 2013

Related U.S. Application Data

(60) Provisional application No. 61/628,386, filed on Oct. 31, 2011.

(51) Int. Cl.
*B60C 11/14* (2006.01)
*B60C 11/00* (2006.01)
*B29D 30/66* (2006.01)
*B60C 11/16* (2006.01)

(52) U.S. Cl.
CPC ............... *B60C 11/00* (2013.01); *B29D 30/66* (2013.01); *B60C 11/1612* (2013.04); *B29D 2030/662* (2013.01); *Y10T 152/10279* (2015.01)

(58) Field of Classification Search
CPC .... B60C 11/14; B60C 11/16; B60C 11/1606; B60C 11/1612; B60C 11/1618; B29D 30/66; B29D 2030/662

USPC ................ 152/210, 211; 29/894.37
See application file for complete search history.

(56) References Cited

U.S. PATENT DOCUMENTS

| | | |
|---|---|---|
| 94,047 A | 8/1869 | Van Choate |
| 97,821 A | 12/1869 | Smoot |
| 325,369 A | 9/1885 | Updegraff |
| 558,167 A | 4/1896 | Field |
| 658,978 A | 10/1900 | Cyr et al. |
| 827,785 A | 8/1906 | Carey |
| 849,587 A | 4/1907 | Warwick |
| 870,719 A | 11/1907 | Freeman |
| 1,034,005 A | 7/1912 | Farnum |
| 1,034,346 A | 7/1912 | Cottrell et al. |
| 1,124,698 A | 1/1915 | Chamberlin |
| 1,153,026 A | 9/1915 | Campbell |
| 1,160,224 A | 11/1915 | Wagenhorst |
| 1,177,461 A | 3/1916 | Wagenhorst |
| 1,331,945 A | 2/1920 | Smith |
| 1,339,732 A | 5/1920 | Allen |
| 1,417,489 A | 5/1922 | Block |

(Continued)

FOREIGN PATENT DOCUMENTS

| | | | |
|---|---|---|---|
| DE | 2604633 | * | 8/1977 |
| JP | 61-207202 | * | 9/1986 |

(Continued)

*Primary Examiner* — Steven D Maki
*Assistant Examiner* — Robert Dye
(74) *Attorney, Agent, or Firm* — Klarquist Sparkman, LLP

(57) ABSTRACT

A vehicle tire includes a selectively actuated stud deployment system for increased traction. The studs are contained in cells in the surface of the tire and forced to deploy by pneumatic or fluid pressure. When the pressure is released, the studs retract.

19 Claims, 4 Drawing Sheets

(56) References Cited

U.S. PATENT DOCUMENTS

| | | | |
|---|---|---|---|
| 1,671,980 | A | 6/1928 | Derry |
| 1,720,396 | A | 7/1929 | Goebel |
| 1,750,209 | A | 3/1930 | Ackerman et al. |
| 1,838,448 | A | 12/1931 | Pomfret |
| 1,853,162 | A | 4/1932 | Jacobi |
| 1,893,718 | A | 1/1933 | Stettner |
| 1,931,785 | A | 10/1933 | Wright |
| 2,031,472 | A | 2/1936 | Errig et al. |
| 2,085,213 | A | 6/1937 | Fergueson |
| 2,229,251 | A | 1/1941 | Meili |
| 2,273,949 | A | 2/1942 | Galanot et al. |
| 2,339,551 | A | 1/1944 | Stevens |
| 2,422,092 | A | 6/1947 | Gregg |
| 2,437,108 | A | 3/1948 | Madison |
| 2,513,673 | A | 7/1950 | Prell |
| 2,559,119 | A | 7/1951 | Frank |
| 2,572,612 | A | 10/1951 | Goepfrich et al. |
| 2,667,365 | A | 1/1954 | Hollifield |
| 2,722,260 | A | 11/1955 | Renwick, Sr. |
| 2,886,138 | A | 5/1959 | Bruner |
| 2,921,759 | A | 1/1960 | Elkin et al. |
| 2,958,143 | A | 11/1960 | Bonic |
| 2,964,245 | A | 12/1960 | Anderson et al. |
| 2,976,033 | A | 3/1961 | Martin |
| 3,027,559 | A | 4/1962 | Moeller et al. |
| 3,035,447 | A | 5/1962 | Carrigan |
| 3,095,918 | A | 7/1963 | Mike |
| 3,120,255 | A * | 2/1964 | Coppola ................ 152/208 |
| 3,167,011 | A | 1/1965 | Gartside et al. |
| 3,263,765 | A | 8/1966 | Just et al. |
| 3,275,085 | A | 9/1966 | Bunting et al. |
| 3,331,423 | A | 7/1967 | Guin |
| 3,340,921 | A | 9/1967 | Garfinkle |
| 3,364,558 | A | 1/1968 | Freet |
| 3,387,352 | A | 6/1968 | Walter |
| 3,388,820 | A | 6/1968 | Lebre |
| 3,427,933 | A | 2/1969 | Taylor-Myers |
| 3,451,564 | A | 6/1969 | Haas |
| 3,487,527 | A | 1/1970 | Melin |
| 3,526,741 | A | 9/1970 | Glorioso |
| 3,553,816 | A | 1/1971 | Arnshav |
| 3,597,572 | A | 8/1971 | Ettinger et al. |
| 3,626,598 | A | 12/1971 | Robertson |
| 3,665,992 | A | 5/1972 | Rossel |
| 3,672,421 | A | 6/1972 | Anderson |
| 3,712,358 | A | 1/1973 | Einarsson |
| 3,766,956 | A | 10/1973 | Ruane et al. |
| 3,773,389 | A | 11/1973 | Foster et al. |
| 3,872,908 | A | 3/1975 | Einarsson |
| 3,926,239 | A | 12/1975 | Petersons et al. |
| 3,942,572 | A | 3/1976 | Crandall |
| 4,119,132 | A * | 10/1978 | Ries ................ 152/208 |
| 4,120,336 | A | 10/1978 | Baskall |
| 4,171,718 | A | 10/1979 | Walrave et al. |
| 4,261,622 | A | 4/1981 | Miller |
| 4,287,926 | A | 9/1981 | Wong |
| 4,529,024 | A | 7/1985 | Vijay |
| 4,598,749 | A | 7/1986 | Mandekic |
| 4,676,289 | A | 6/1987 | Yi Su |
| 4,838,329 | A | 6/1989 | Ohuchi et al. |
| 4,842,086 | A | 6/1989 | Michna |
| 4,844,137 | A | 7/1989 | Einarsson |
| 4,883,104 | A | 11/1989 | Minami |
| 4,966,080 | A | 10/1990 | Teissier et al. |
| 5,115,747 | A | 5/1992 | Teissier et al. |
| 5,198,048 | A | 3/1993 | Hojo |
| 5,198,049 | A | 3/1993 | Hojo |
| 5,221,379 | A | 6/1993 | Nicholas |
| 5,411,070 | A | 5/1995 | Yadegar |
| 5,609,700 | A | 3/1997 | West |
| 5,642,921 | A | 7/1997 | Webb et al. |
| 5,707,463 | A | 1/1998 | Hansen |
| 5,788,335 | A | 8/1998 | O'Brien |
| 5,810,451 | A | 9/1998 | O'Brien |
| 6,022,082 | A | 2/2000 | O'Brien |
| 6,044,883 | A | 4/2000 | Noyes |
| 6,244,666 | B1 | 6/2001 | O'Brien |
| 6,386,252 | B1 | 5/2002 | O'Brien |
| 6,668,685 | B2 | 12/2003 | Boston |
| 6,905,564 | B1 | 6/2005 | O'Brien et al. |
| 7,093,369 | B2 | 8/2006 | Ohnesorge |
| 7,987,889 | B1 | 8/2011 | Story |
| 8,075,294 | B2 | 12/2011 | Cuny et al. |
| 8,082,961 | B2 | 12/2011 | Collette et al. |
| 8,186,984 | B2 | 5/2012 | Cuny et al. |
| 8,186,985 | B2 | 5/2012 | Cuny et al. |
| 8,196,637 | B1 | 6/2012 | Story |
| 8,215,367 | B1 | 7/2012 | Story |
| 8,225,838 | B1 | 7/2012 | Story |
| 8,267,679 | B2 | 9/2012 | Cuny et al. |
| 2005/0092411 | A1 | 5/2005 | O'Brien |
| 2005/0206098 | A1 | 9/2005 | Ohnesorge |
| 2006/0191615 | A1 | 8/2006 | O'Brien et al. |
| 2007/0079915 | A1 | 4/2007 | Jones |
| 2007/0144646 | A1 | 6/2007 | Mancia et al. |
| 2008/0047645 | A1 | 2/2008 | Gerhardt et al. |
| 2008/0066348 | A1 | 3/2008 | O'Brien et al. |
| 2009/0165912 | A1 | 7/2009 | Collette et al. |
| 2010/0159047 | A1 | 6/2010 | Cuny et al. |
| 2010/0276045 | A1 | 11/2010 | Cuny et al. |
| 2011/0042875 | A1 | 2/2011 | Story |
| 2011/0151038 | A1 | 6/2011 | Cuny et al. |
| 2011/0151039 | A1 | 6/2011 | Cuny et al. |
| 2011/0151040 | A1 | 6/2011 | Cuny et al. |

FOREIGN PATENT DOCUMENTS

| | | | |
|---|---|---|---|
| JP | 63-184508 | * | 7/1988 |
| JP | 03-295710 | * | 12/1991 |
| JP | 10-175407 | * | 6/1998 |

* cited by examiner

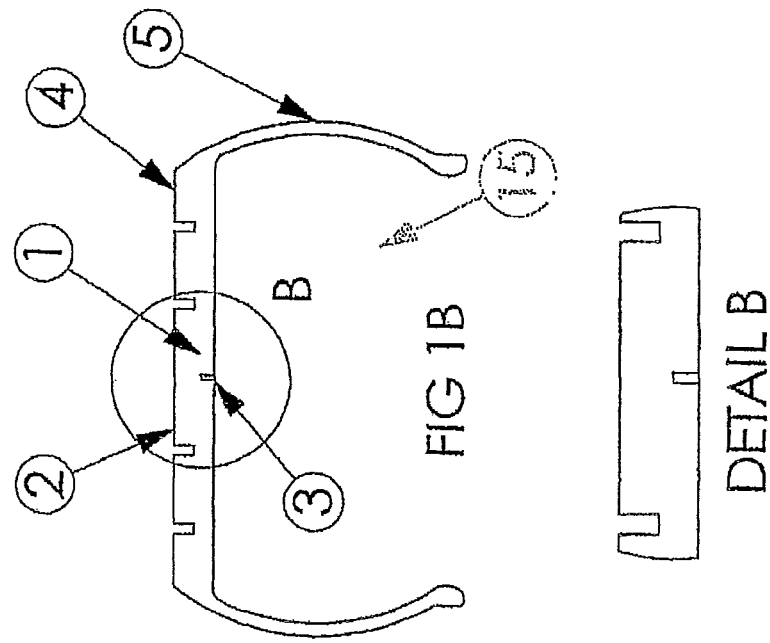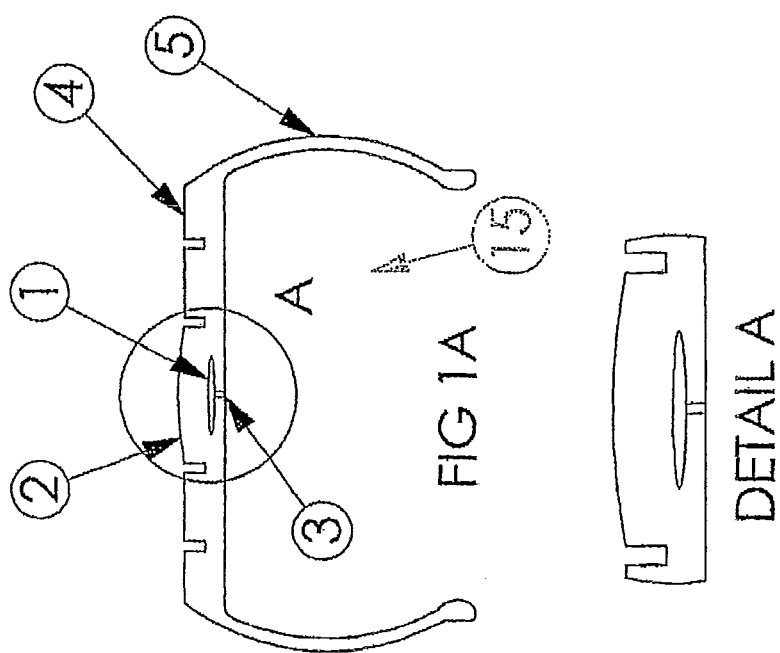

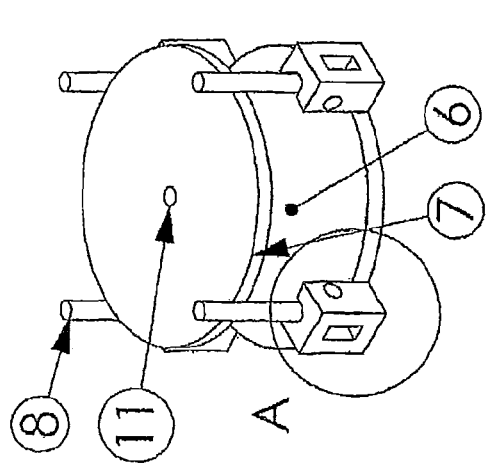
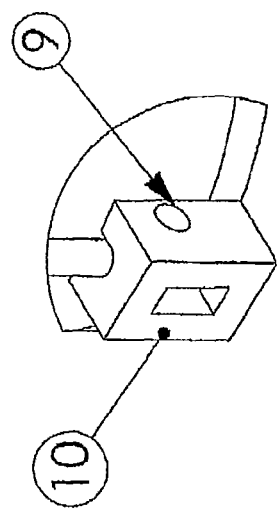
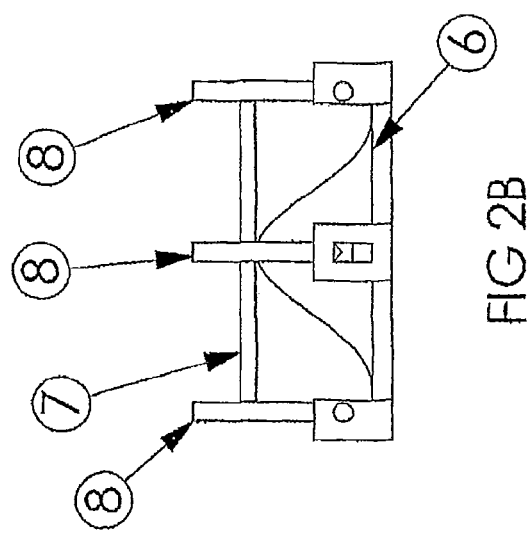
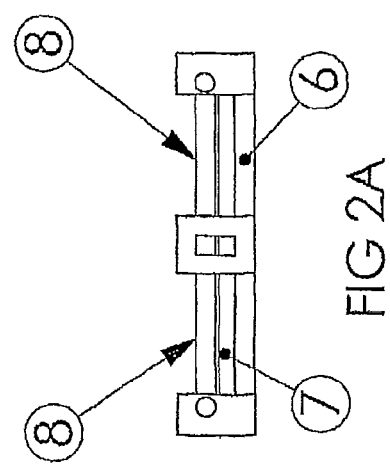

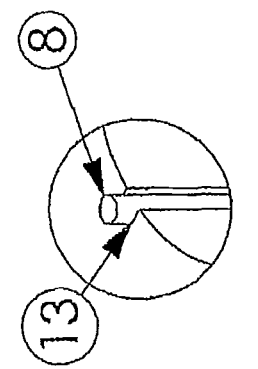
DETAIL D
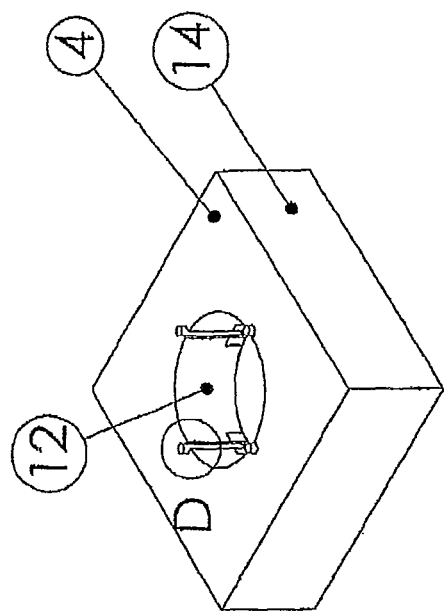
FIG 3B
FIG 3
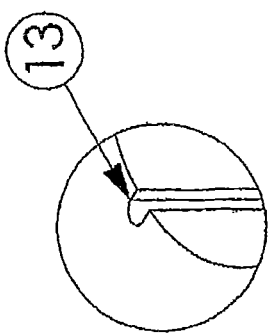
DETAIL C
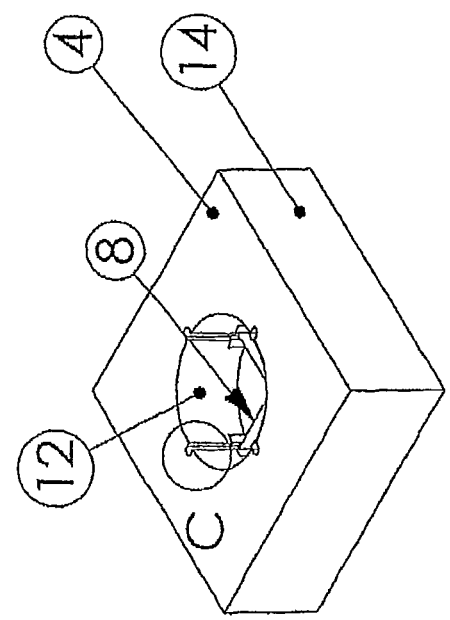
FIG 3A

ALL SEASON SAFETY TIRE

CROSS-REFERENCE TO RELATED APPLICATIONS

This application claims the benefit of U.S. Provisional Application No. 61/628,386 filed Oct. 31, 2011.

STATEMENT REGARDING FEDERALLY SPONSORED RESEARCH OR DEVELOPMENT

Not applicable.

NAMES OF PARTIES TO A JOINT RESEARCH AGREEMENT

Not applicable.

REFERENCE TO SEQUENCE LISTING, A TABLE, OR A COMPUTER PROGRAM LISTING COMPACT DISC APPENDIX

Not applicable.

BACKGROUND OF THE INVENTION

Field of the Invention

The invention relates to tires that include features that may enhance safety and usability in a variety of driving conditions as well as some manufacturing processes that may be used during the production of referenced tires

BRIEF SUMMARY OF THE INVENTION

Traditional tires have demonstrated shortcomings regarding practical solutions addressing safety and passenger comfort. Issues such as correct tire pressure, all season traction and tread wear beyond the recommended limit have all contributed to unsafe driving conditions and traffic accidents. This invention can address those issues and enhance safety and comfort as well as reduce damage to road surfaces.

Incorrect tire pressure has been reported as the cause of traffic accidents. Embodiments of the invention may include features illustrated in the drawing and detailed description of embodiment of the invention portions of this application/document allowing the tire(s), and supporting valve assembly, to create and maintain the correct air pressure within the main tire cavity and/or other cavities described herein.

Winter driving conditions can present driving challenges. Snow and ice reduce the traction of typical non-winter tires requiring the use of chains and/or a separate set of tires for winter use, possibly including studs. Installing tire chains is time consuming, can be inconvenient, and can cause damage to road surfaces. Buying and maintaining a second set of tires for winter represents additional cost and several states have forbidden the use tires with permanently exposed studs due to damage caused to road surfaces.

Embodiments of the invention may include features illustrated in the drawing and detailed description of embodiment of the invention portions of this application that may selectively and/or automatically deploy stud(s) contacting and/or piercing the ice or snow improving traction. The selective nature of the stud(s) may improve traction on ice and snow as well as bare roads where exposed studs have been reported to reduce traction. The selective nature of the studs may also reduce damage to road surfaces and may be acceptable in states where tires with fixed studs are not allowed.

Tire tread that is worn beyond the recommended limit can reduce traction and the integrity of the tire. Many individuals are not aware of the point where tire(s) should be replaced. Embodiments of the invention may include features illustrated in the drawing and detailed description of embodiment portion(s) of this application that may provide an audible and/or visual indication of the end of the recommended useful life condition of the tire(s).

The foregoing and other objectives, features, and advantages of the invention will be more readily understood upon consideration of the following detailed description of the invention, taken in conjunction with the accompanying drawings.

BRIEF DESCRIPTION OF THE SEVERAL VIEWS OF THE DRAWINGS

FIG. 1 is a schematic illustration of components of a system in accordance with the invention.

FIG. 2 is a schematic illustration of additional components of a system in accordance with the invention.

FIG. 3 is a schematic illustration of additional components of a system in accordance with the invention.

DETAILED DESCRIPTION OF PREFERRED EMBODIMENT

Figure 4:
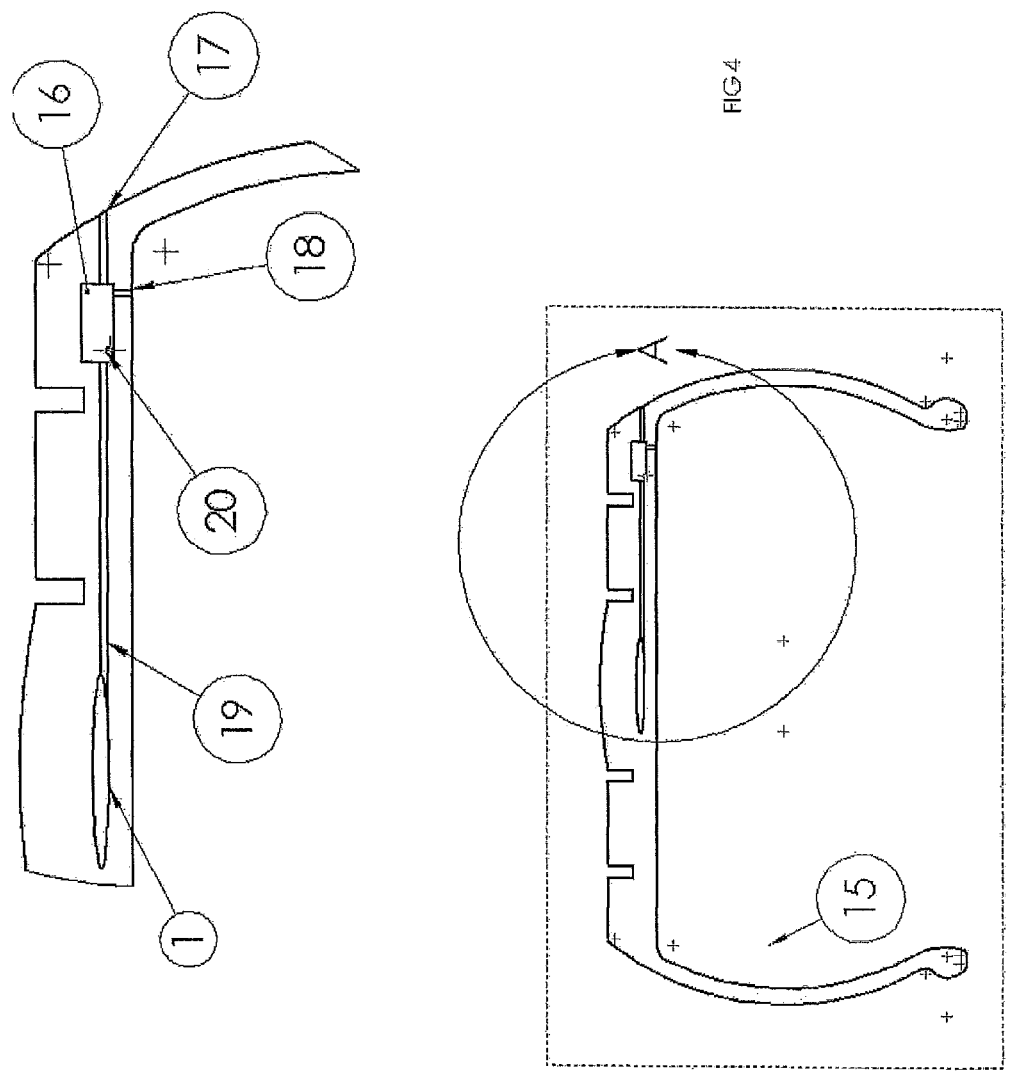
FIG. 4 is a partial cutaway view showing a vehicle tire with conduits and valve systems.

In the following detailed description, reference is made to the accompanying drawings which form a part hereof and in which is shown by way of illustration embodiments in which the invention may be practiced. It is to be understood that other embodiments may be utilized and structural or logical changes may be made without departing from the scope of the present invention. Therefore, the following detailed description is not to be taken in a limiting sense.

Various operations may be described as multiple discrete operations in turn, in a manner that may be helpful in understanding embodiments of the present invention; however, the order of description should not be construed to imply that these operations are order dependent.

The description may use orientation and/or perspective-based descriptions such as up/down, back/front, and top/bottom. Such descriptions are merely used to facilitate the discussion and are not intended to restrict the application of embodiments of the present invention.

The description may use phrases such as "in an embodiment," or "in embodiments." Such phrases may each refer to one or more of the same or different embodiments. Furthermore, the terms "comprising," "including," "having," and the like, as used with respect to embodiments of the present invention, are synonymous.

The phrase "A/B" means "A or B." The phrase "A and/or B" means "(A), (B), or (A and B)." The phrase "at least one of A, B and C" means "(A), (B), (C), (A and B), (A and C), (B and C) or (A, B and C)." The phrase "(A) B" means "(B) or (A B)," that is, A is optional.

Reference is made to FIG. 1, which provides a schematic overview of components of a system in accordance with embodiments of the present invention. Embodiments of the invention may include a tire with one or more chamber(s) 1 either within the tire tread, outside the tire core, as illustrated and/or within the interior main tire chamber 15, inside the tire core. Chamber(s) 1 may be constructed to be normally biased to an open condition as seen in FIG. 1A and/or drawn to an open position as a result of centrifugal force of tire rotation. The chamber(s) 1 may take on various shapes including an elongated form generally following the circumferential shape of the tire. The chamber(s) 1 may have a permanent and/or temporary sealed beginning and/or end. The chamber(s) may also contain one or more port(s) 3 capable of allowing air and/or gas and/or fluid, any and/or all of which are referenced as (air). In this document, to flow into and/or out of the chamber(s) 1 as the chamber(s) 1 are compressed as illustrated in FIG. 1B and/or return to an open position as illustrated in FIG. 1A. Although the port(s) 3 are shown to be directed into the main tire chamber 15 in FIG. 1, it is anticipated the port(s) may connect to and/or include an integral and/or attached conduit and/or conduits within and/or on the surface of the tire tread 4 and/or sidewall 5 and/or main tire cavity 15 and/or unattached within the main tire cavity 15. It is anticipated conduit(s) may be similarly integral and/or attached as previously described and used to facilitate movement of air and/or vacuum to and/or from any combination of air chamber(s) 1 and/or stud lift chamber(s) FIG. 2 feature 6 and/or holding areas/chambers and/or main tire cavity (15) and/or valve(s) and/or ambient air, outside the tire, and/or other locations in various embodiment(s).

The weight of the vehicle tends to compress the portion of the tire contacting the road surface. Chamber(s) 1 may also be compressed as illustrated in FIG. 1B. Compression of chamber(s) 1 may create a seal enhancing compression of the air in the as yet uncompressed portion of chamber(s) 1. The seal point as described may move as the tire(s) rotate creating an increase in air pressure and/or volume of pressurized air in and/or moving from the as yet uncompressed portion of chamber(s) 1. Chamber(s) 1 may be small enough to allow compression of all or a portion of the air within the entire chamber(s) 1 generally simultaneously without tire rotation and the resulting previously described moving seal. Embodiments may include characteristics in the tread such as that illustrated in FIGS. 1A and 1B, feature 2 that may help direct the force of the weight of the vehicle to enhance compression and/or sealing of the chamber(s) 1. Combining the compression of the chamber 1 due to the weight of the vehicle with the rotation of the tire may tend to cause an increase in air pressure in the portion(s) of the chamber(s) 1 not yet compressed which may be directed through a port or ports located in the portion(s) of the not yet compressed chamber(s) for use and/or storage elsewhere or exhausted. This pressurized air may be directed through a conduit or conduits into the main tire chamber 15 and/or to other chamber(s) 1 and/or stud lift chamber(s) FIG. 2 feature 6 and/or other holding area/chamber(s) and/or a valve or valves that may be included in embodiments of the invention.

The valve and/or valves as well as conduit(s) may be used in embodiment(s) to selectively direct air and/or vacuum to and from; the chamber(s) 1 and/or main tire chamber 15 and/or stud lift chamber(s) FIG. 2 feature 6 and/or other holding area(s)/chamber(s) and/or ambient (outside) air. It is anticipated air and/or vacuum may also be directed to and/or from other combinations of chambers and/or valve(s) and/or holding areas(s)/chamber(s) and/or ambient air outside the tire. Valve(s) may be located within the main tire chamber 15 and/or wheel and/or built in to the tire tread 4 and or sidewall 5 and/or other location on the vehicle.

Embodiments may include a port or ports 3 located in the portion of the chamber(s) 1 first compressed as previously described and may tend to create a vacuum as the tire rotates and the chamber(s) return to their normally biased open position. This vacuum may be directed through the conduit(s) and/or valve(s) and used to reduce pressure in the main tire chamber 15 and/or to provide and/or assist retraction of the stud lift chamber FIG. 2 feature 6 and/or to maintain the stud lift chamber FIG. 2 feature 6 in the retracted position add/or to facilitate other features related to invention function(s).

Reference is made to FIG. 4, which provides a schematic overview of components of a system in accordance with embodiments of the present invention. Embodiments may include one or more conduit and/or valve system(s) 16 to selectively facilitate the movement of air drawn in from outside the tire through conduit section(s) 17, the valve assembly (ies) 16 and conduit section(s) 19 to the pump chamber 1. Pump chamber(s) 1 may have closed ends allowing the flow of air into and out of the pump chamber(s) 1 only through one or more conduit sections 19 connecting the pump chamber(s) to the valve assembly(ies) 16. The normally biased to an uncompressed position pump chamber(s) 1 will tend to create pressurized air when compressed and a vacuum as they return to an uncompressed state. Once the pump chamber(s) are compressed or released, the pressurized air or vacuum may be selectively directed to and/or from the pump chamber(s) 1 through the connecting conduit(s) 19 to the valve assembly (ies) 16 and then selectively through connecting conduit(s) 18 to the main tire cavity 15 and/or the stud lift chamber(s) 6 FIG. 2 through connecting conduit(s) 20 and/or exhausted to outside the tire through conduit section(s) 17. Pressurized air in the stud lift chamber(s) 6 FIG. 2 and/or main tire chamber 15 may also be selectively released by the valve system(s) 16 to outside the tire through their connecting conduit(s) 20, 18 and conduit section 17. It is further understood that outside air may be drawn through conduit(s) section 17 to the valve assembly(ies) 16 and selectively to the pump chamber(s) through conduit section(s) 19.

Some embodiments may not include the pump chamber(s) 1 and the connecting conduit(s) 19, in which case the valve assembly(ies) 16 and associated conduit sections 18, 20 may selectively direct pressurized air from the main tire chamber 15 to the stud lift chamber(s) 6 FIG. 2 and selectively release pressurized air from the stud lift chamber(s) 6 FIG. 2 through the conduit section(s) 20 and valve assembly(ies) 16 to outside the tire through conduit section(s) 17. This method of using compressed air in the main tire chamber 15 to inflate the stud lift chamber(s) 6 FIG. 2 may also be used in embodiments that include the Pump chamber(s) 1.

Some embodiments may not include the retractable stud feature in which case conduit section(s) 20 and the stud lift chamber(s) 6 FIG. 2 will not be included. In these embodiments outside air may be drawn in through conduit section(s) 17 to the valve assembly(ies) 16 and selectively directed through conduit section(s) 19 to the pump chamber(s) 1. Once the pump chamber(s) 1 are compressed the pressurized air may be selectively directed back through conduit section(s) 19 to the valve assembly(ies) 16, through conduit section(s) 18 and into the main tire chamber 15. The valve assembly 16 may also selectively release pressurized air from the main tire chamber 15 to outside the tire through conduit section(s) 17 to maintain the desired pressure.

The schematics in (FIG. 4) are intended to generally illustrate components and function. The actual location of the valve assembly(ies) and/or conduit sections may vary as described in the previous provisional application.

Reference is now made to FIG. 2, which provides an overview of components of a system in accordance with embodiments of the present invention. Embodiments of the invention may include one or more stud assemblies. Although this example illustrates a generally round shape and having multiple studs 8, it is anticipated the assembly may be various shapes including an elongated form and may include one or more stud(s) 8. It is further anticipated that, although in this illustration the assembly may indicate a separate assembly, some and/or all features such as stud mount/pivot(s) 9 and/or pivot guide support(s) 10 and/or stud lift chamber(s) 6 and/or stud(s) 8 and/or other features may be molded directly into the tire tread either during the tread manufacturing process or as a secondary operation. It is anticipated any or all components of the assembly not molded into the tread during manufacture of the tread may be installed as a secondary operation and may be removable and/or fixed in place by features creating mechanical retention and/or adhesive and/or secondary thermal bonding and/or by other means.

Embodiments may include one or more stud assembly(ies) that may facilitate selective deployment of stud(s) 8 to contact and/or pierce ice and/or snow, etc. to improve traction. Embodiments may include stud(s) 8 pivotally mounted to rotate from a generally parallel to the tire tread face position (withdrawn) within the tire tread to a position generally perpendicular to the tire tread face (extended). When the stud(s) 8 are in the extended position a portion of the stud(s) 8 may protrude beyond the tread face FIG. 1 feature 4.

Embodiments may include stud(s) 8 that are allowed to pivot/rotate freely as a result of a generally round generally smooth surface on the pivoting/rotating portion of the Stud(s) 8 within a generally round and generally smooth surface within the pivot guide 9 and/or may be normally biased to a generally withdrawn, generally parallel to the tread face FIG. 1 feature 4, position by creating features such as flat, grooved and/or protruding fins, etc. on the pivoting/rotating portion of the stud(s) 8 and surrounding and/or attaching and/or potting the rotating/pivoting portion of the stud(s) 8 in a resilient material and/or by other spring means or a combination of smooth guide(s) and/or biasing features as described. The resilient material may be that of the pivot guide support 10 and/or the tire tread material and/or other resilient material attached to or surrounding the pivoting/rotating portion of stud(s) 8 prior to and/or during manufacturing the tire tread. Biasing stud(s) to a generally withdrawn position may be accomplished by means of resilient material and/or other spring means contacting and/or being compressed as stud(s) 8 pivot/rotate from a withdrawn position to an extended position. It is also anticipated pivoting/rotation of the stud(s) 8 from an extended to a withdrawn position and/or holding stud(s) in a withdrawn position may be facilitated by attachment of stud(s) to the lift plate 7 and/or stud lift chamber 6.

Embodiments may include a feature(s) where the end of and/or other non pivoting/rotating portion the stud(s) 8 away from the pivot/rotation portion are normally biased, by means previously described, to a withdrawn position that may allow the stud(s) to contact the road surface when the tire tread has worn to the point where replacement is recommended. The resilience of the stud(s) 8 mounting may allow the stud(s) 8 to rebound or bounce from the road surface as a result of contact with the road surface without damage to the road surface. This contact between the stud(s) and road surface may provide an audible and/or visual indication to the driver and/or passengers and/or individuals around the vehicle of the end of recommended life condition of the tire(s).

Embodiments may include a stud lift chamber 6 that when inflated expands/extends generally toward the tread face from a recessed location within the tread. The stud lift chamber 6 may be normally biased to a withdrawn position by use of a resilient material and/or other spring means and/or vacuum. As the stud lift chamber 6 expands/extends portions/features of the stud lift chamber 6 may contact the stud(s) 8 moving them from a withdrawn position to an extended position. As the stud lift chamber 6 is withdrawn, the stud(s) 8 may return to their normal withdrawn position as a result of a normal bias as previously described and/or attachment to the stud lift chamber 6. The stud lift chamber 6 may have the general appearance of a dome or cone or other shape or as an air bag with generally vertical sides when expanded/extended. The stud lift chamber may be formed into the tire during manufacturing process or be part of a secondary installation operation.

Embodiments may include a lift plate 7. The lift plate 7 may rest of the top surface of the stud lift chamber 6 and may enhance contact with the stud(s) 8 as the stud lift chamber 6 is expanded/extended and/or withdrawn. The lift plate 7 may be attached to the stud lift chamber at a single or multiple points 11. The lift plate 7 may be attached to and/or formed into the top surface of the stud lift chamber 6. The lift plate 7 may have feature(s) to enhance physical contact with stud(s) 8. The lift plate 7 may include a wiper seal at the outer edge. The lift plate 7 may have features such as holes to allow any water or contaminants under the lift plate to evaporate and/or flow to the outside. The stud lift chamber 6 and/or lift plate 7 may include features such as studs and/or other traction enhancing characteristics attached to the outer surface of the stud lift chamber 6 and/or lift plate 7 that may contact and/or pierce ice and/or snow when the stud lift chamber 6 is expanded/extended.

Reference is now made to FIG. 3 which provides an overview of components of a system in accordance with embodiments of the present invention. FIG. 3 illustrates a portion of tread 14 (the material outside the tire core) surrounding a recess 12 where some or all previously described (FIG. 1 and FIG. 2) stud assembly components may be located and/or originate.

A feature or features 13 may be included in the tread to guide and/or support the stud(s) 8. These features may be molded into the tire tread and/or be an extension of the pivot guide support FIG. 2 feature 10 and/or be separate components molded into and/or attached to the tread and/or unattached to the tire tread.

Although certain embodiments have been illustrated and described herein for purposes of description of the preferred embodiment, it will be appreciated by those of ordinary skill in the art that a wide variety of alternate and/or equivalent embodiments or implementations calculated to achieve the same purposes may be substituted for the embodiments shown and described without departing from the scope of the present invention. Those with skill in the art will readily appreciate that embodiments in accordance with the present invention may be implemented in a very wide variety of ways. This application is intended to cover any adaptations or variations of the embodiments discussed herein.

The terms and expressions that have been employed in the foregoing specification are used therein as terms of description and not of limitation, and there is no intention, in the use of such terms and expressions, of excluding equivalents of the features shown and described or portions thereof, it being recognized that the scope of the invention is defined and limited only by the claims which follow.

We claim:

1. In a vehicle tire, a selectively actuated stud deployment system comprising a plurality of cells in a tread portion of said vehicle tire, each of said cells comprising a set of studs, each stud in said set of studs being mounted for rotation about a pin from a retracted position substantially parallel to an outer radial surface of the tread portion to a deployed position substantially perpendicular to said outer radial surface and extending radially beyond said outer radial surface, and an actuating member interacting with each of said studs in said set to selectively cause said set of studs to rotate from said retracted position to said radially deployed position, wherein each said actuating member is disposed entirely within the respective cell of said tread portion and said actuating member is actuated by air pressure.

2. The vehicle tire of claim 1 wherein said actuating member comprises an inflatable bladder and a lift plate, the lift plate bearing against said set of studs when said bladder is inflated thereby causing said set of studs to rotate from said retracted position to said deployed position.

3. The vehicle tire of claim 2 further including a plurality of radial slots in said tread portion for receiving and supporting said studs when said studs are fully extended in said deployed position.

4. The vehicle tire of claim 1 wherein said tread portion has a thickness and wherein said actuating member is connected to a source of air pressure by at least one channel extending through said tread portion.

5. The vehicle tire of claim 4 wherein air pressure is generated by a source external to said vehicle tire coupled to said channel.

6. The vehicle tire of claim 4 including a hollow tire core wherein said air pressure is generated from within said hollow core of said vehicle tire.

7. The vehicle tire of claim 4 wherein said at least one channel extends circumferentially through the tread portion and is coupled to an inflatable bladder of said actuating member.

8. The vehicle tire of claim 4 wherein the source of air pressure is at least one pump chamber which is disposed in the tread portion, and wherein the pump chamber is coupled to the channel.

9. The vehicle tire of claim 4 further comprising a valve that is configured to selectively direct air from the source of air pressure to the actuating member.

10. The vehicle tire of claim 9 wherein the valve is configured to selectively direct air from the source of air pressure and air from the actuating member to outside of the tire.

11. The vehicle tire of claim 4 wherein the channel comprises a first end portion connected to the source of air pressure and a second end portion connected to the actuating member.

12. The vehicle tire of claim 4 wherein the channel comprises an open end portion which opens external to the tire.

13. The vehicle tire of claim 12 wherein the open end portion of the channel opens at a sidewall portion of the tire.

14. The vehicle tire of claim 1 further comprising a plurality of actuating members, wherein each actuating member is disposed entirely within a respective cell of the tread portion.

15. The vehicle tire of claim 1 wherein free ends of a respective set of studs are directed generally toward each other when the studs are in the retracted position and are directed generally away from each other when the studs are in the deployed position.

16. The vehicle tire of claim 1 further comprising a valve that is configured to selectively direct air from a main tire cavity to the actuating member and to selectively direct air from the actuating member to outside of the tire.

17. A method of attaching studs to a vehicle tire comprising:
  installing an actuating member within a cell of a tread portion of the tire, wherein the actuating member is actuated by air pressure;
  locating the actuating member entirely within the cell of the tread portion; and
  installing a plurality of studs within the cell of the tread portion of the tire, wherein the studs are configured to selectively rotate from a retracted position in which the studs are substantially parallel to an outer tread face to a deployed position substantially perpendicular to and extending radially beyond the outer tread face.

18. The method of claim 17 wherein installing the actuating member and the plurality of studs occurs during a tire manufacturing process.

19. The method of claim 17 wherein installing the actuating member and the plurality of studs occurs after an initial manufacturing process as part of a secondary installation process.

* * * * *